United States Patent [19]

Mochizuki et al.

[11] Patent Number: 4,817,918
[45] Date of Patent: Apr. 4, 1989

[54] APPARATUS FOR FILTERING MOLTEN SCRAPS OF METAL FOR REGENERATION

[75] Inventors: Shogo Mochizuki, Shimizu; Hisao Isogai, Fuji; Sadanori Ishikawa, Shimizu; Mitsuyoshi Mochizuki, Shizuoka, all of Japan

[73] Assignee: Nippon Light Metal Co., Ltd., Tokyo, Japan

[21] Appl. No.: 108,650

[22] Filed: Oct. 15, 1987

[30] Foreign Application Priority Data

Oct. 17, 1986 [JP] Japan .......................... 61-159254[U]

[51] Int. Cl.$^4$ .............................................. C21D 11/00
[52] U.S. Cl. ...................................... 266/87; 266/207; 266/227
[58] Field of Search ................ 266/87, 905, 900, 901, 266/166, 165, 227, 229, 207

[56] References Cited

U.S. PATENT DOCUMENTS

| | | | |
|---|---|---|---|
| 1,292,582 | 1/1919 | Coulson | 266/207 |
| 3,917,242 | 11/1975 | Bass et al. | 266/207 |
| 4,113,241 | 9/1978 | Dore | 266/901 |
| 4,712,774 | 12/1987 | Louis | 266/901 |

*Primary Examiner*—L. Dewayne Rutledge
*Assistant Examiner*—S. Kastler
*Attorney, Agent, or Firm*—Oblon, Fisher, Spivak, McClelland & Maier

[57] ABSTRACT

The apparatus for filtering scraps of light metal for regeneration thereof comprises an upper vessel having heating means for maintaining the scraps, charged therein for the filtration thereof, at a predetermined temperature so as to melt the same or for maintaining molten metal, supplied therein after having been molten, at the predetermined temperature, a lower vessel having heating means, filtering means interposed between the upper and lower vessels, temperature controlling means for both the heating means, pressurizing means connected to the upper vessel and/or depressurizing means connected to the lower vessel, and a lifting/lowering device for the upper vessel and/or a transporting device for the lower vessel. The apparatus may further comprise an inner vessel for receiving molten metal having been passed through the filter means, which is freely removably arranged in the lower vessel.

3 Claims, 4 Drawing Sheets

APPARATUS FOR FILTERING MOLTEN SCRAPS OF METAL FOR REGENERATION

BACKGROUND OF THE INVENTION

The present invention relates to an apparatus for filtering molten scraps of light metals such as magnesium and aluminum alloys in the industrial scale for regenerating and/or refining the same.

Recently, the amount of the recycled metals such as magnesium and aluminum alloys regenerated from the scraps thereof for the reuse of the same has has been increased year by year and such a recycling of the metals serves greatly for the save of energy and for the supplementation of metallic resources.

Furthermore, the regeneration of used metallic materials such as magnesium and aluminum alloys resulting from the production processes has become important. Such a regeneration of metals is not limited to metals such as magnesium and aluminum alloys but is extended to other metals.

As a process for regeneration, a process has been known as disclosed in U.S. Pat. No. 4,385,931 wherein a layer of flux is formed on the bottom of the processing furnace installed stationarily and molten metal to be regenerated is charged in the processing furnace so that it is passed through the layer of flux thereby permitting the inclusions such as oxides contained in the molten metal to be absorbed and separated.

With the above mentioned process, however, since the production efficiency and the yield are low, this process has not been carried out in the industrial scale. For example, when the metal of magnesium alloy is passed through a flux layer, loss of the metal caused by being carried away by the flux layer is great so that the yield is lowered. On the other hand, the flux is carried into the molten metal passing through the flux layer and, since it is difficult to completely remove the flux from the molten metal, corrosion resisting property of the regenerated metal is lowered by the chlorine contained in the flux. Furthermore, since the stocks stored outdoor or the scraps collected from cities contain oils and a large amount of dusts, the processing of such stocks and scraps is troublesome and the production efficiency becomes low, while much amount of the flux is consumed in the processing. Therefore, the payability becomes remarkably worse and the quality of the regenerated metal is deteriorated.

In consideration of the troubles due to the use of the flux as described above, a process has been proposed for regenerating scraps of metal without using flux. This process is based on the principle to remove impurities by the filtration as disclosed in the Japanese Patent Publication No. 56-18063.

Such a prior art of filtering apparatus is, however, has a low production efficiency and such an apparatus will give rise to various defects in operation in the industrial scale.

SUMMARY OF THE INVENTION

The present applicant has solved the difficulties in productivity, operations and economy described above.

Therefore, it is an object of the present inveniton to provide an apparatus of the filtration type for regenerating scraps of metal such as aluminum alloy and magnesium alloy which permits the operation to be carried out efficiently with a high yield and sufficiently capable of carrying out in the industrial scale.

A further object is to provide an apparatus of the type described above by which the operability is greatly improved and the loss caused during processing of the metal and the energy loss are greatly reduced.

The above objects are achieved in accordance with the present invention to provide an apparatus for filtering molten scraps of light metal for regeneration thereof comprising an upper vessel having heating means for maintaining the scraps of the light metal charged therein for the filtering thereof at a predetermined temperature in order to melt the same or for maintaining molten metal, supplied therein after having been preliminarily molten, at the predetermined temperature, a lower vessel having heating means, filtering means interposed between the upper vessel and the lower vessel, temperature controlling means for both the heating means, pressurizing means connected to the upper vessel and/or depressurizing means connected to the lower vessel, and a lifting/lowering device for the upper vessel and a transporting device for the lower vessel.

In accordance with a further characteristic feature of the present invention, there is provided an apparatus for filtering molten scraps of metal for regeneration thereof including an upper vessel having heating means for maintaining the scraps of the metal, charged therein for the filtering thereof, at a predetermined temperature in order to melt the same or for maintaining molten scraps of metal supplied therein after having been preliminarily molten at the predetermined temperature, a lower vessel having heating means, filtering means interposed between the upper vessel and the lower vessel, temperature controlling means for both the heating means, pressurizing means connected to the upper vessel and/or depressurizing means connected to the lower vessel, and a lifting/lowering device for the upper vessel and a transporting device for the lower vessel, wherein an inner vessel for receiving the molten metal which has been passed through the filtering means is freely removably arranged within the lower vessel.

In accordance with a still further characteristic feature of the present invention, argon gas for pressurization and SF$_6$ gas mixed with dried air are supplied into the interior of the upper vessel to allow forcible filtration and to positively prevent the molten metal from being oxidized, in case scraps of metal include magnesium alloy.

Furthermore, the diameter of the lower end of the crucible in the upper vessel may be enlarged toward downwardly in order to positively avoid that the residual generated during filtering operation is left adhered on the inner surface of the crucible when the upper vessel is moved apart from the lower vessel, thereby preventing the residual left adhered on the inner surface of the crucible from burning.

With the above described apapratus of the present invention, it is made possible to carry out in the industrial scale the regeneration of scraps of metal such as magnesium alloy and aluminum alloy which has never been achieved by the prior art apparatus.

Furthermore, the regeneration of scraps of magnesium alloy can be achieved without using flux in accordance with the present invention.

Since the filtering means is interposed between the upper vessel and the lower vessel, and both the vessels can be moved in the desired directions relative to each other, the operability of the apparatus is greatly enhanced.

The weight of the molten metal per se can be utilized for the filtration thereof.

Furthermore, a forcible filtration can be achieved by the medium of oxidation preventing gas supplied into the interior of the upper vessel thereby making it possible to use filtering means having filtering pores of smaller size so that the quality of the regeneration can be greatly enhanced without lowering the productivity.

Furthermore, with the apparatus of the present invention, automated operation of the apparatus can be easily achieved. The provision of the inner vessel removably arranged in the lower vessel permits the operation to be greatly efficient and economical.

The fresh magnesium ingots available in the market usually contain 2-80 ppm of chlorine which deteriorates the corrosion resisting property. However, the regenerated ingot produced in accordance with the present invention contains only less than 0.3 ppm of chlorine and, therefore, the present invention greatly improves the corrosion resisting property. It is believed that the residual chlorides can be effectively removed from the regenerated ingot in accordance with the present invention.

DETAILED DESCRIPTION OF THE PREFERRED EMBODIMENTS

Figure 1:
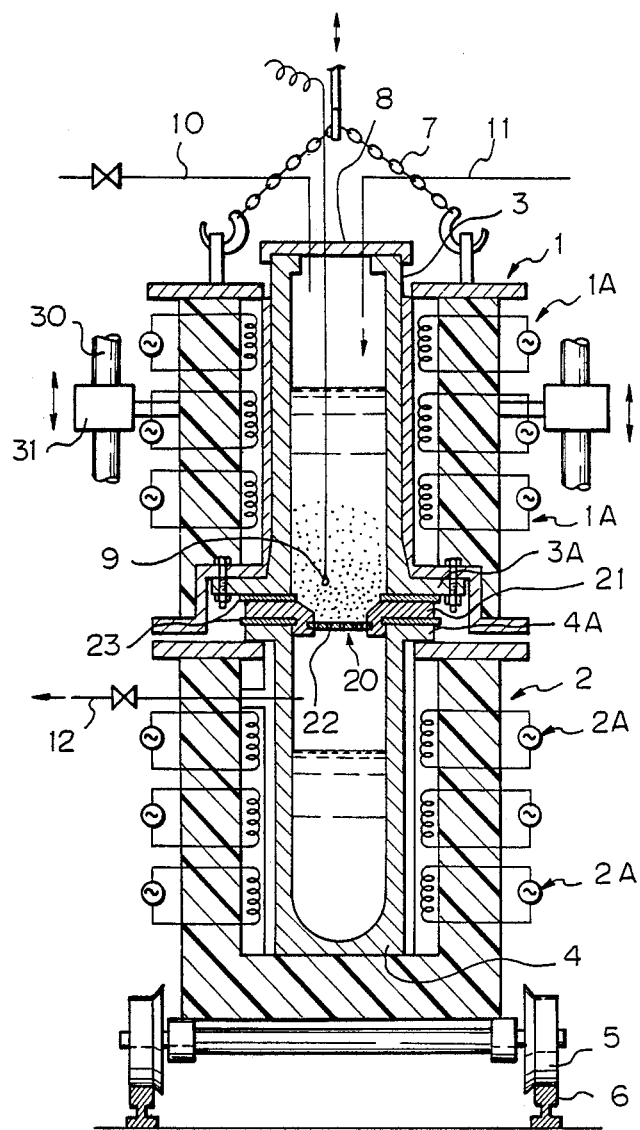
FIG. 1 is a schematic sectional view showing the basic construction of the apparatus for filtering scraps of metal in accordance with the present invention.

Referring to FIG. 1, the embodiment shown therein comprises an upper vessel 1 in the form of an electric furnace provided with a plurality of electric heating coils 1A capable being energized independently from each other, a lower vessel 2 in the form of an electric furnace having a plurality of electric heating coils 2A similar in construction and function to the electric heating coils 1A. The upper vessel 1 is adapted to receive and hold therein a crucible 3 and the lower vessel 2 is adapted to receive and hold therein a crucible 4 in the similar manner as the upper vessel 1. To this end, the lower flange 3A of the crucible 3 is fixedly secured to the radially outwardly extended lower portion of the upper vessel 1 by bolts, while the crucible 4 is adapted to be inserted into the interior of the lower vessel 2 so that the radially outwardly extended upper flange 4A is seated on the upper end of the lower vessel 2 so as to be held stationarily.

The crucible 3 is in the cylindrical form having upper and lower openings, while the crucible 4 is in the cylindrical form having an open upper end and a closed lower end. These crucibles 3 and 4 are made of graphite or cast iron. However, each vessel can be lined with refractory bricks on the inner surface thereof so as to form an integral construction for use in place of the crucible.

The lower vessel 2 is provided with wheels 5 rollingly supported on rails 6 secured on the floor of the regeneration equipment so as to be moved therealong. Appropriate driving means may be provided for moving the lower vessel 2 and, furthermore, such driving means may be optionally controlled so that it is operated automatically after termination of the filtering operation. In the embodiment shown, the lower vessel 2 is shown as a manually operable construction so as to be moved manually. On the other hand, the upper vessel 1 is adapted to be hung by an appropriate lifting/lower device (not shown) through a chain 7 so that the upper vessel 1 can be moved upwardly and downwardly. The upward and downward movement of the upper vessel 1 by the lifting/lowering device may be automatically controlled in response to the positioning of the lower vessel 2 in position and the termination of the filtering operation in the same manner as the control of the movement of the lower vessel 2. In order to guide the vertical movement of the upper vessel 1, guide rods 30 are provided and slidably engaged with sliders 31 fixedly attached to the upper vessel 1, respectively.

A lid 8 is provided for sealingly closing the upper open end of the crucible 3. A temperature sensor 9 is located in the interior of the crucible 3 for measuring the temperature therein. An argon gas supplying pipe 10 is provided to lead into the crucible 3 through the lid 8 for pressurizing the interior of the crucible 3 to permit the forcible filtration of the molten metal therein as described later, while a supplying pipe 11 is provided leading into the interior of the crucible 3 through the lid 8 for supplying mixture of $SF_6$ and dried air in order to prevent the molten metal therein including magnesium alloy from being oxidized. A depressurizing pipe 12 is provided leading from the interior of the crucible 4 to the exterior thereof in order to depressurize the interior of the crucible 4.

Filtering means 20 is interposed between the upper vessel 1 and the lower vessel 2. The filtering means 20 comprises a filter holder 21 made of the same material such as graphite or cast iron as that of the crucibles 3, 4 and a filtering material 22 interchangeably attached to the filter holder 21. The filtering material 22 may be a ceramic filter or a filter made of sintered fibers of ferrous metal. Furthermore, a filtering member having a particle capturing ability may be optionally used by placing a fibrous ceramic cloth or a porous brick material on a porous plate made of iron. A rolled steel plate for making a boiler may be used as the filter holder 21 but the material for forming the filter holder 21 is not limited to those described above. If necessary, it is also possible to maintain the filter holder 21 at the desired temperature by embedding heating means such as electric heating wires inside the filter holder 21.

The filtering means 20 is adapted to be located in position on the upper end flange 4A of the crucible 4 in the lower vessel 2, and the lower end flange 3A of the crucible 3 fixedly secured to the upper vessel 1 is designed to be supported in position on the filtering means 20. Since the surfaces of the flange 4A, the filtering means 20 and the flange 3A facing and abutting against each other must be sealed air-tightly in order to permit the crucible 3 to be pressurized and the crucible 4 to be depressurized thereby making it possible to carry out forcible filtration of the molten metal as described later, suitable gaskets 23 are interposed between the abutting surfaces according to the necessity.

The apparatus for the regeneration described above is operated as follows.

Scraps of metal to be regenerated is charged into the crucible 3 located in the upper vessel 1 or metal preliminarily having been molten is supplied into the crucible 3. In case the scraps are charged, heating means must be provided in the upper vessel 1 which can generate heat enough to melt the scraps. At any rate, it is preferable to preheat the crucible 3 in the upper vessel 1. When metal of aluminum alloy is regenerated and refined, the crucible 3 is appropriately maintained at a temperature, lower than the temperature of the molten metal, which is near the crystallization temeprature of impurities determined on the basis of the temperature of liquidus line in order to carry out the filtration.

Since the representative composition of magnesium alloy for diecasting is 90 wt % Mg, 9 wt % Al, 0.5–0.9 wt % Zn and residual and the solidification temperature thereof is about 590° C., it is in general preferred to carry out filtration by maintaining the temperature of the molten metal at about 630° C. in case impurities mainly consisting of oxides are to be removed from such a diecasting alloy. Thus, the preheating temperature and the filtration temperature are selected appropriately depending upon the metal to be processed. If the filtration temperature is lower than the predetermined temperature, residuals remained after filtration will lower the yield. To the contrary, when the filtration temperature is too high, oxidation of the molten metal is intensified and the cost for energy increases too.

When the molten scraps are supplied into the crucible 3, the scraps are preliminarily molten in a separate melting furnace.

When the molten magnesium is processed, scraps of aluminum to which magnesium is added are regenerated for refining, or scraps of magnesium are regenerated separately, oxidation of the metal subjected to processing is prevented by introducing mixture of $SF_6$ gas and dried air into the crucible 3 through the operations described above.

Since the present invention intends to remove inclusions contained in the molten metal therefrom by the filtration process, usual refining process with flux is not required. The molten metal of scraps of magnesium alloy, for example, is sufficiently agitated appropriately at the temperature in the range of about 680°–700° C. under the atmosphere of the mixture of $SF_6$ gas and the dried air so that the entire amount of the agitated molten metal can be supplied into the crucible 3 in order to improve the yield. It is preferred that the temperature of the molten metal of the scraps supplied into the crucible 3 is lowered for a short time to a temperature near the filtering temperature which is appropriate for the filtration of the metal in order to enhance the productivity.

According to tests, it has been found that the molten metal of magnesium alloy having the weight of about 100 Kg and the temperature of 680°–700° C. which was supplied into the crucible 3 preheated to about 630° C. could be lowered its temperature to the aimed temperature of 630° C. within about 5 min.

After it is ascertained by the temperature sensor 9 that the required filtering temperature is achieved, the interior of the crucible 3 is pressurized by introducing gas therein through the gas supplying pipe 10 or the interior of the crucible 4 is depressurized by exhausting the interior of the crucible 4 through the depressurizing pipe 12.

After the filtration terminates, the upper vessel 1 is moved upwardly by the lifting/lowering device and, then, the lower vessel 2 is moved along the rails 6 together with the filtering means 20. Thereafter, the filtering means 20 is removed from the lower vessel 2. The residual left on the filter material 22 after filtration is treated appropriately together with the filter holder 21.

Then, the filtered molten metal received in the crucible 4 in the lower vessel 2 is taken out therefrom by any of appropriate measures such as manual ladling-out, vacuum drawing operation, pressurized ladling-out, drawing operation through tapping hole and the like. Thus, the regenerated molten metal is obtained.

In case the molten metal such as that including magnesium alloy liable to be oxidized is processed, dried air mixed with about 0.5% $SF_6$ gas is supplied into the crucible 3 through the supplying pipe 11 so as to suppress the oxidation, when the scraps are being molten in the crucible 3 or the preliminarily molten scraps in the crucible 3 is processed therein. The mixture of dried air and $SF_6$ gas is also introduced into the crucible 4 in the lower vessel 2. In the similar manner as described above, it is preferred to blow the mixture of dried air and $SF_6$ gas against the filtering means 20 in order to prevent the residual thereon from being oxidized. Any inactive gases other than the above described mixture may be used for the same purpose.

Figure 2:
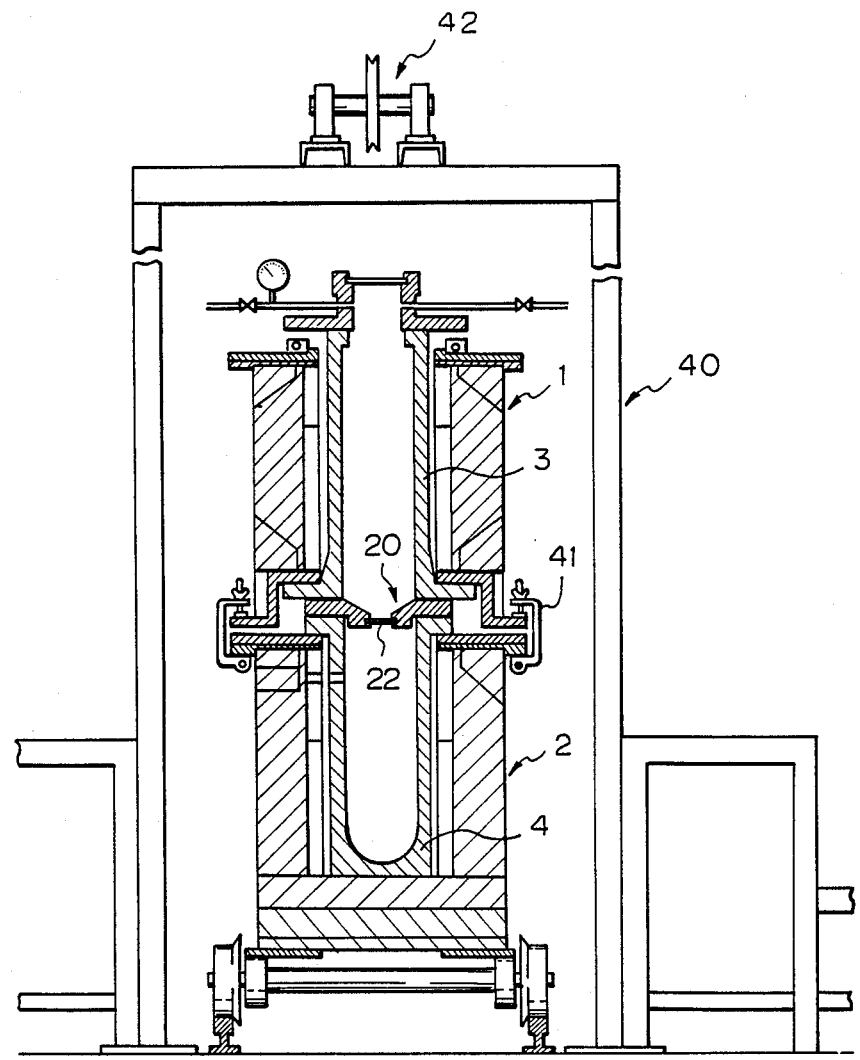
FIG. 2 is a longitudinal sectional view showing the apparatus, shown in FIG. 1, brought into the outer structure of the regeneration equipment.

FIG. 2 shows the state in which the above described filtering apparatus is received in position within the outer structure 40 of the filtering equipment. The upper vessel 1 and the lower vessel 2 are shown securely clamped together by clamping means 41. However, the clamping means 41 may be omitted depending upon the weight of the upper vessel 1. A sprocket 42 is shown mounted on the top of the outer structure 40 which serves to vertically move the upper vessel 1 by means of a chain (not shown) stretched around the sprocket 42. Any suitable means for lifting and lowering the upper vessel 1 other than the sprocket 42 shown in FIG. 2 may be used for the same purpose.

Figure 3:
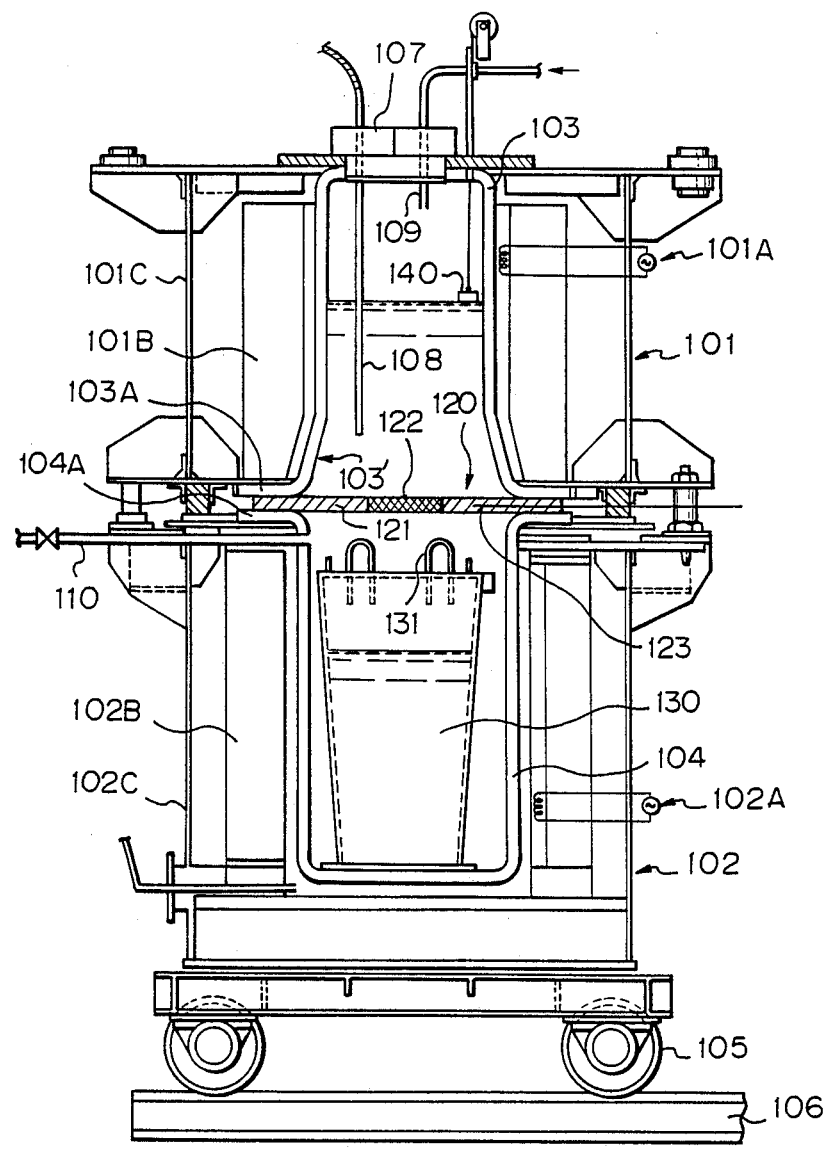
FIG. 3 is a longitudinal sectional view showing another embodiment of the apparatus for regenerating scraps of metal in accordance with the present invention.

FIG. 3 shows another embodiment of the present invention. The embodiment comprises in like manner as FIG. 1 an upper vessel 101 in the form of an electric furnace provided with a plurality of electric heating coils 101A separately energized from each other, and a lower vessel 102 also in the form of an electric furnace having a plurality of electric heating coils 102A similar to the electric heating coils 101A. Each of the upper and lower vessels 101, 102 is adapted to receive therein a crucible 103, 104, respectively. Heat insulating materials 101B and 102B surround the crucibles 103, 104, respectively, for the heat insulating purpose. Outer shell members 101C, 102C are provided around the upper and the lower vessels 101, 102, respectively.

The crucible 103 is in the cylindrical form having upper and lower open ends, and the lower open end is enlarged its diameter toward downwardly as shown by the reference numeral 103′. On the other hand, the crucible 104 is in the cylindrical form having an open upper end and a lower closed end. These crucibles are made of iron, preferably cast steel or steel plates, the outer surface of each of which is either maintained as it is or is subjected to aluminizing process so as to form thereon a layer of aluminum alloy.

In accordance with the characteristic feature of the present invention, the embodiment shown in FIG. 3 is provided with an inner vessel 130 adapted to be removably received within the crucible 104 for receiving the molten metal which has been filtered in the same manner as described in connection with FIG. 1. The inner vessel 130 as hook means 131 fixedly secured to the upper edge thereof at diametrically opposite positions to each other, thereby making it possible that the inner vessel 130 is hung and lifted and lowered by using appropriate hanging means engageable with the hook means 131 so that it can be removed from the crucible 104 in the lower vessel 102 after the upper vessel 101 has been moved apart from the lower vessel 102 in the same manner as described previously. The inner vessel 130 may be made of an appropriate material known as that used to receive molten metal.

In like manner as described previously, the lower vessel 102 is provided with wheels 105 driven by appropriate driving means (not shown) and adapted to rollingly ride on rails 106, respectively, so as to move the lower vessel 102 along the rails 106, the driving means being pneumatic, for example, and automatically controlled, if desired, so that the lower vessel 102 is automatically operated after the upper vessel 101 is moved apart therefrom after termination of the filtering operation. The upper vessel 101 can be lifted and lowered by appropriate hanging means (not shown) and may be automatically controlled in relation to the lower vessel 102 and the termination of the filtering operation.

A lid 107 closes the upper open end of the crucible 103, and a temperature sensor 108 inserted through an opening in the lid 107 and located in the crucible 103 detects the temperature therein. A gas supplying pipe 109 passing through the lid 107 into the interior of the crucible 103 supplies the mixture of dried air and 1-2% SF$_6$ gas for preventing oxidation of the molten metal particularly containing magnesium alloy. A float type level gauge 140 passes through an opening in the lid 107 into the crucible 103 for detecting the level of the molten metal therein. A depressurizing pipe 110 is provided leading from the interior of the crucible 104 within the lower vessel 102 outwardly therefrom in order to exhaust the interior of the crucible 104 to depressurize the same.

In the similar manner as described previously, filtering means 120 comprising a filter holder 121 made of ductile case iron and a filtering material 122 mounted thereon is interposed between the upper vessel 101 and the lower vessel 102 and the upper surfaces of the filter holder 121 and the filtering material 122 are made coplanar and are preferably made planar, respectively, so as to achieve air-tight engagement with the lower surface of the crucible 103 in the upper vessel 101 when it is mounted in position on the filtering means 120. The filtering material 122 may be of a ceramic filter or a sintered fibrous filter of ferrous material. A filter member having a particle capturing property may be optionally used wherein a fibrous ceramic cloth or a porous brick material is located on a porous plate made of iron. The filter holder 121 may be made also of a rolled plate for making a boiler, but the material therefor is not limited to those described above. If necessary, heating means such as an electric heating wire may be embedded within the filter holder 121 in order to maintain the same at the desired temperature. Maintaining the filter holder 121 at the desired temperature is advantageous to improve the stability in the filtering operation. To this end, it is preferred to provide a further temperature sensor 123 in the filter holder 121 for measuring the temperature thereof.

The filtering means 120 is secured in position by airtightly locating the filter holder 121 between the lower flange 103A of the crucible 103 and the upper flange 104A of the crucible 104. The air-tight engagemetn of the abutting surfaces of the flanges and the filter holder is required for insuring the effects of pressurization of the crucible 103 and the depressurization of the crucible 104 as described previously. Appropriate gaskets interposed between the abutting surfaces may be used in insuring the air-tightness between the abutting surfaces as described previously.

In operation, scraps of metal to be regenerated either in the state as those are or preliminarily molten are charged into the crucible 103 in the upper vessel 101 in like manner as described previously. In case the scraps are charged in the state as those are, heating means capable of generating sufficient heat for mleting the scraps must be provided. At any rate, the crucible 103 is preferably preheated. The processes carried out by the apparatus shown in FIG. 3 and the function thereof are substantially similar to those described previously in connection with the apparatus shown in FIG. 1. Therefore, detailed description thereof is omitted here.

In the apparatus shown in FIG. 3, however, since the diameter of the lower end 103' of the crucible 103 is enlarged toward downwardly, it is positively avoided that the residual generated by the filtering operation is held adhered on the inner surface of the crucible 103 when the upper vessel 101 is moved upwardly apart from the lower vessel 102 with the filtering means 120 mounted on the upper end of the lower vessel 102. If the residual is kept adhered on the inner surface of the crucible 103, there is the danger of causing burning of the residual. Therefore, the configuration of the crucible 103 having the lower end enlarged its diameter toward downwardly is very effective to avoid the danger of burning of the residual. The taper angle is preferably set to about 10°, but other taper angle may be possible.

Figure 4:
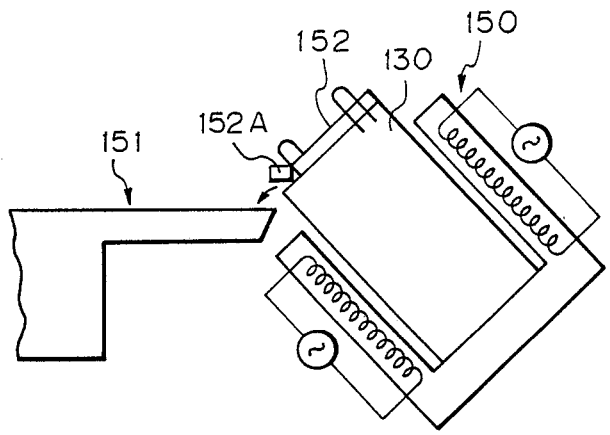
FIG. 4 is a schematic sectional view showing the temperature keeping vessel, as an example of using, having heating means which is for pouring molten metal from the inner vessel into the casting mold.

After the filtering means 120 is removed from the lower vessel 102, the inner vessel 130 in which the filtered molten metal is received is hung upwardly by the hook means 131. When the molten metal contains magnesium alloy, a suitable lid 152 is preferably attached to the upper open end of the inner vessel 130 as shown in FIG. 4 in order to avoid the oxidation of the molten metal therein. Furthermore, it is preferred to locate the inner vessel 130 having the molten metal therein within a temperature keeping vessel 150 which has electric heating coils therein. After the temperature keeping vessel 150 is brought to the position of ingot mold 151 having heating means together with the inner vessel 130, the vessel 150 is tilted and a small lid 152A forming a part of the lid 152 is opened so that the molten metal in the inner vessel 130 is poured into the ingot mold 151 as shown in FIG. 4.

Figure 5:
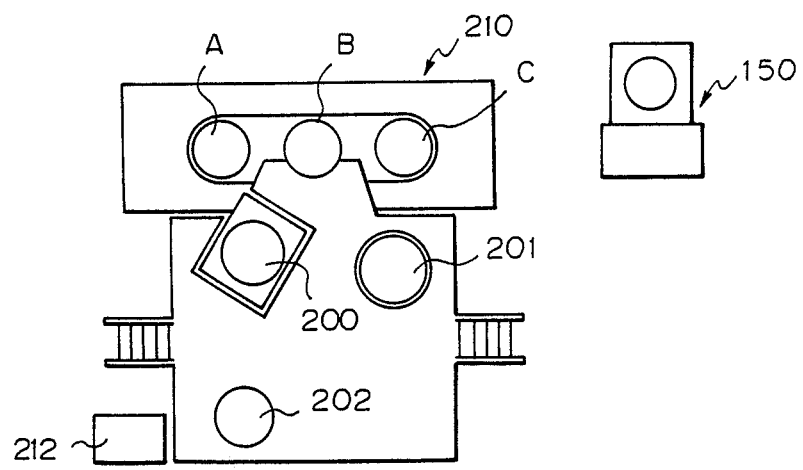
FIG. 5 is a schematic plan view showing the layout of the production line in which the apparatus of FIG. 3 is preferably used.

FIG. 5 shows the layout of the regeneration line using the apparatus shown in FIG. 3. The filtering apparatus 210 of the present invention is arranged in position relative to a magnesium melting furnace 200, an aluminum melting furnace 201 and a magnesium preheating furnace 202. The above described temperature keeping vessel 150 is arranged in relation to the filtering apparatus 210 as shown. In order to control the operation of the arrangement described above, a control board 212 is provided.

The upper vessel is vertically movably arranged at the station B above the lower vessel when it is located at the station B. On the other side, the lower vessel is laterally movable in one direction to the station A and in the opposite direction to the station C beneath the upper vessel.

In operation, one of the lower vessels located at the station A, for example, is under preparation for the subsequent filtering operation, while the upper and the lower vessels located at the station B are under filtering operation. After termination of the filtering operation at the station B, the upper vessel is moved upwardly apart form the lower vessel at the station B for the cleaning operation, and then, the lower vessel at the station B is moved to the station C where the filter means is removed and processed as described previously. The inner vessel is brought into the temperature keeping vessel and supplied to the ingot mold as described previously. At the same time, the lower vessel having been located at the station A and having terminated preparation for subsequent filtering operation is brought to the station B and the upper vessel is lowered on the lower vessel with the filter means being interposed therebetween for the filtering operation as described previously.

In order to prevent burning of the residual generated by the filtering operation, nitrogen gas is preferably supplied into the upper vessel prior to the removal thereof from the lower vessel, while cooling the same. This serves to shorten the cycle time of the filtering operation for the regeneration of the scraps. Since the leakage of the molten metal from the inner vessel to the lower vessel is very dangerous, appropriate detecting means of leakage is advantageously provided in the lower vessel.

EXAMPLE 1

In the apparatus shown in FIG. 1, the crucibles 3, 4 both made of graphite were used, and a filtering means 20 was used in which a filtering material 22 having the diameter of 100 mm and width of 10 mm and having the pores of the average diameters of 170 $\mu$m was mounted on a filter holder 21 made of graphite so as to carry out the tests for regenerating scraps of aluminum alloy.

The test samples of the scraps were set to have the weight of 10 Kg and they were charged into the crucible 3 located in the upper vessel 1 so that they were molten at the temperature of 750° C. After the scraps were completely molten, the temperature was lowered to 605° C. for about 1 hour. Thereafter, the atmosphere in the crucible 3 was pressurized to the gauge pressure of 0.5 atm. by nitrogen gas so as to commence the filtering operation. After termination of the filtration, the composition of the regenerated molten metal was measured as follows:

|  | Sample | Filtered molten metal | Residual | Unclear component |
| --- | --- | --- | --- | --- |
| Wt. (Kg) | 10 | 8.5 | 1 | 0.5 |
| Composition (%) |  |  |  |  |
| Si | 10.3 | 9.5 | 9.8 | — |
| Fe | 1.5 | 0.72 | 8.7 | — |
| Mn | 1.5 | 0.35 | 9.8 | — |
| Al | balance | balance | balance | — |

EXAMPLE 2

In contrast to the Example 1, the crucible 3, 4 and the filter holder 21 were each cast iron made and the filtering material 22 having the pores of mean diameter of 220 $\mu$m was used. 2.5 Kg of magnesium having the purity of 99.9% was added to the scraps of aluminum and the mixture was molten at the temperature of 720° C. Then, the temperature was lowered to 540° C. for 1 hour. Thereafter, the crucible 4 in the lower vessel 2 was depressurized to 0.5 atm. for carrying out the filtering operation. In order to prevent the oxidation of the molten metal, the mixture of dried air and 2% of SF$_6$ was supplied as described previously. After the termination of the filtering operation, the composition of the filtered molten metal was measured as follows:

|  | Mg | Sample | Filtered molten metal | Re- sidual | Unclear component |
| --- | --- | --- | --- | --- | --- |
| Wt. (Kg) | 2.5 | 7.5 | 8.5 | 1.5 | negligible |
| Composition (%) |  |  |  |  |  |
| Si |  | 0.6 | 0.26 | — | — |
| Fe |  | 1.53 | 0.09 | 7 | — |
| Cu |  | 0.10 | 0.08 | — | — |
| Mn |  | 0.88 | 0.09 | 3 | — |
| Zn |  | 0.04 | 0.03 | — | — |
| Mg |  | 1.3 | 30 | — | — |

EXAMPLE 3

The tests were carried out in the same manner as the Example 2 except that 7.0 Kg of aluminum scraps and 3.0 Kg of magnesium having the purity of 99.9% were used in the tests and the temperature of the molten metal after melting was lowered to 540° C. for 1 hour. The results are as follows:

|  | Mg | Sample | Filtered molten metal | Re- sidual | Unclear component |
| --- | --- | --- | --- | --- | --- |
| Wt. (Kg) | 3.0 | 7.0 | 8.2 | 1.6 | 0.2 |
| Composition (%) |  |  |  |  |  |
| Si |  | 0.52 | 0.52 | — | — |
| Fe |  | 1.18 | 0.05 | 5 | — |
| Cu |  | 0.44 | 0.29 | — | — |
| Mn |  | 0.99 | 0.08 | 3.5 | — |
| Zn |  | 0.3 | 0.21 | — | — |
| Mg |  | 0.94 | 32 | — | — |

As the results show, it has been proved that the filtering apparatus of the present invention can regenerate scraps of aluminum with sufficient high refining property, while a high operability is achieved.

EXAMPLE 4

10 Kg of scraps of magnesium for diecasting available in the market was used, and, after removing oil and dusts therefrom by wire brushes, the scraps were preliminarily molten in a crucible at the temperature of 700° C. During the melting operation, the crucible was filled with mixture of dried air and SF$_6$ gas. After agitation of the molten metal, the entire quantity of the molten metal was charged in the crucible 3 made of cast iron. The crucible 3 and the filtering means were preheated to the temperature of 600° C. The mixture of dried air and SF$_6$ gas was introduced into the upper vessel 1 through the gas supplying pipe 11, and, at the same time, a small quantity of the mixture was also supplied into the lower vessel 2. When the temperature of the charged molten magnesium scraps was lowered to 640° C. (for about 10 min.), the lower vessel 4 made of cast iron was depressurized to 0.5 atm. and the filtering operation was commenced using the filtering material made of alumina material which had pores of average diameter of 200 μm. The results of the composition of the regenerated molten metal are as follows:

|  | Sample | Filtered molten metal | Residual | Unclear component |
| --- | --- | --- | --- | --- |
| Wt. (Kg) | 9.8 | 8.8 | 0.7 | 0.1 |
| Composition (%) |  |  |  |  |
| Si | 0.21 | 0.23 |  |  |
| Fe | 0.03 | <0.01 |  |  |
| Cu | 0.06 | 0.06 |  |  |
| Mn | 0.23 | 0.20 |  |  |
| Al | 5.8 | 5.9 |  |  |
| Zn | 0.42 | 0.45 |  |  |
| Mg | balance | balance |  |  |

EXAMPLE 5

In the similar way as described in the Example 4, regeneration of other samples was carried out. The filtering means used in these tests was of mullite material and had pores of the average diameter of 200 μm. The results of the regeneration were as follows:

|  | Sample | Filtered molten metal | Residual | Unclear component |
| --- | --- | --- | --- | --- |
| Wt. (Kg) | 9.4 | 8.5 | 0.9 | 0 |
| Composition (%) |  |  |  |  |
| Si | <0.05 | <0.05 |  |  |
| Fe | 0.01 | 0.01 |  |  |
| Cu | 0.06 | 0.07 |  |  |
| Mn | 0.15 | 0.13 |  |  |
| Al | 8.7 | 8.8 |  |  |
| Zn | 0.62 | 0.65 |  |  |
| Mg | balance | balance |  |  |

As described above, the inclusions were sufficiently removed in the case of craps of magnesium alloy like the case of scraps of aluminum alloy.

Furthermore, cast ingots were produced from the regenerated molten magnesium and from the molten magnesium before it was subjected to regeneration, and the measurement of the quantity of oxygen were carried out by the purity tests and the neutron activation analysis of inclusions existing in the fractured surface of the cast ingots of both kinds of the molten metals. The results showed that the purity of the regenerated molten metal was remarkably improved in comparison with that of the molten metal without being regenerated. The number of inclusions in the regenerated molten metal was only 1/7.0 sq. cm in contrast to 1000/7.0 sq. cm in the molten metal without being regenerated, and the content of oxygen in the regenerated molten metal was 0.016% in contrast to 0.10% in the molten metal without being regenerated.

EXAMPLE 6

8.430 Kg of molten scraps of magnesium was filtered by the apparatus shown in FIG. 3. The yield of the regeneration was 89% and 7.500 Kg of the regeneraged magnesium was obtained. As the byproducts, 420 Kg (5%) of residual of filtration was obtained. Furthermore, the concentration of oxygen in the regenerated magnesium was 100 ppm and the concentration of hydrogen was 9 cc/100 g, while the concentration of chlorine was 0.2 ppm.

What is claimed is:

1. An apparatus for filtering scraps of light metal for regeneration thereof, comprising (1) an upper vessel having heating means for maintaining the scraps of the light metal charged therein for the filtration thereof, at a predetermined temperature in order to melt the same or for maintaining molten metal supplied therein after having been preliminarily molten, at said predetermined temperature, (2) a lower vessel having heating means, filtering means comprising a filtering material interchangeably mounted on a filter holder and interposed between said upper vessel and said lower vessel, the upper surface of said filtering material being rendered to be in a planar form, (3) temperature controlling means for both said heating means, (4) pressurizing means connected to said upper vessel or depressurizing means connected to said lower vessel, said upper and lower vessels being made of cast steel or steel plates, (5) a lifting/lowering device for said upper vessel and (6) a transporting device for said lower vessel, wherein an inner vessel for receiving the molten metal which has been passed through said filtering means is freely and removably arranged within said lower vessel.

2. The filtering apparatus for regenerating metallic scraps according to claim 1, wherein at least said upper vessel is in the cylindrical form, the lower end of which is tapered so as to be downwardly enlarged.

3. The filtering apparatus for regenerating metallic scraps according to claim 1, wherein the outer surface of said vessels is aluminized.

* * * * *